Dec. 12, 1950 G. H. PRIDE 2,534,057
LOAD HANDLING APPARATUS FOR VEHICLES
Filed Dec. 16, 1948 5 Sheets-Sheet 1

INVENTOR
GEORGE H. PRIDE
BY
Frazer, Myers & Manley
ATTORNEYS

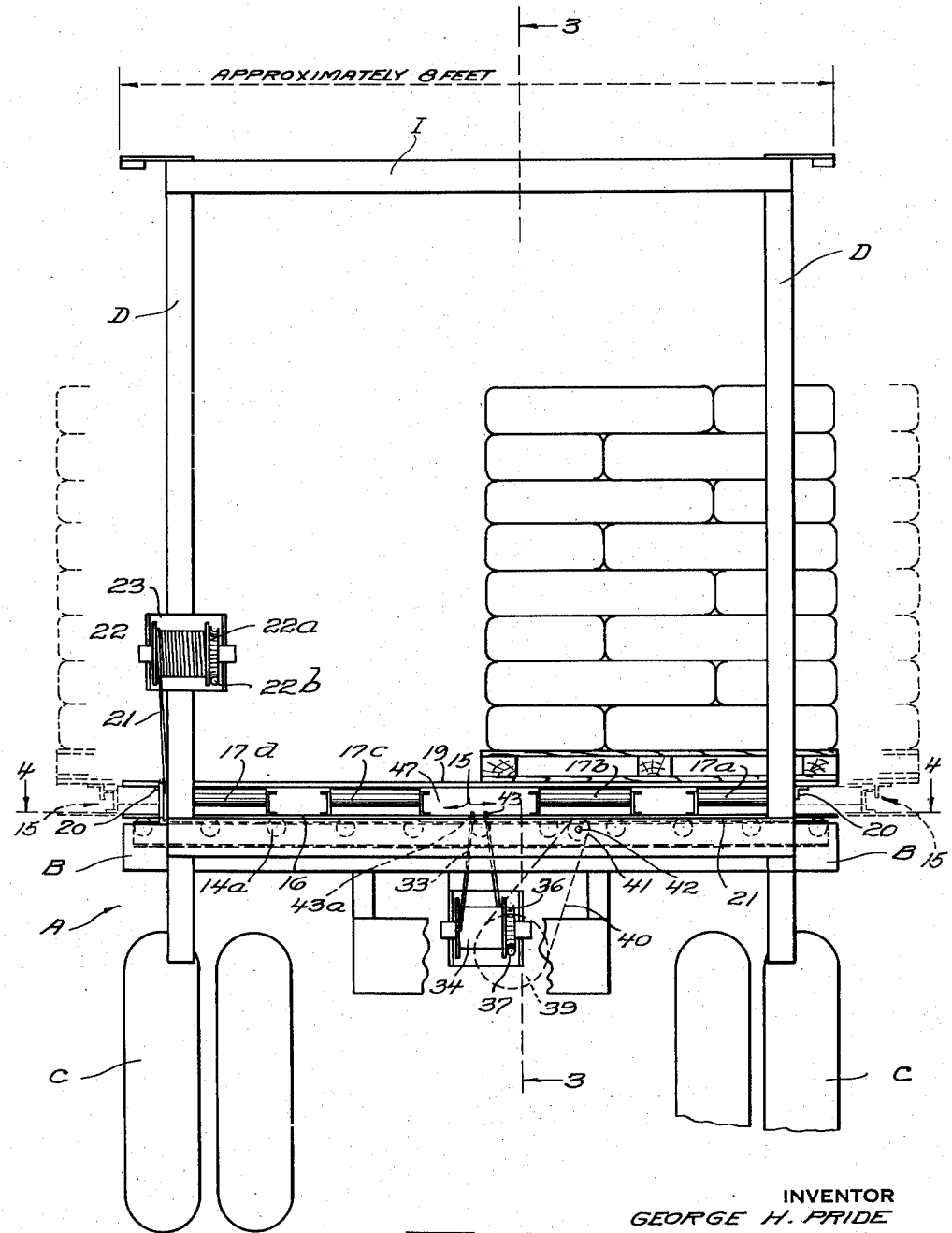

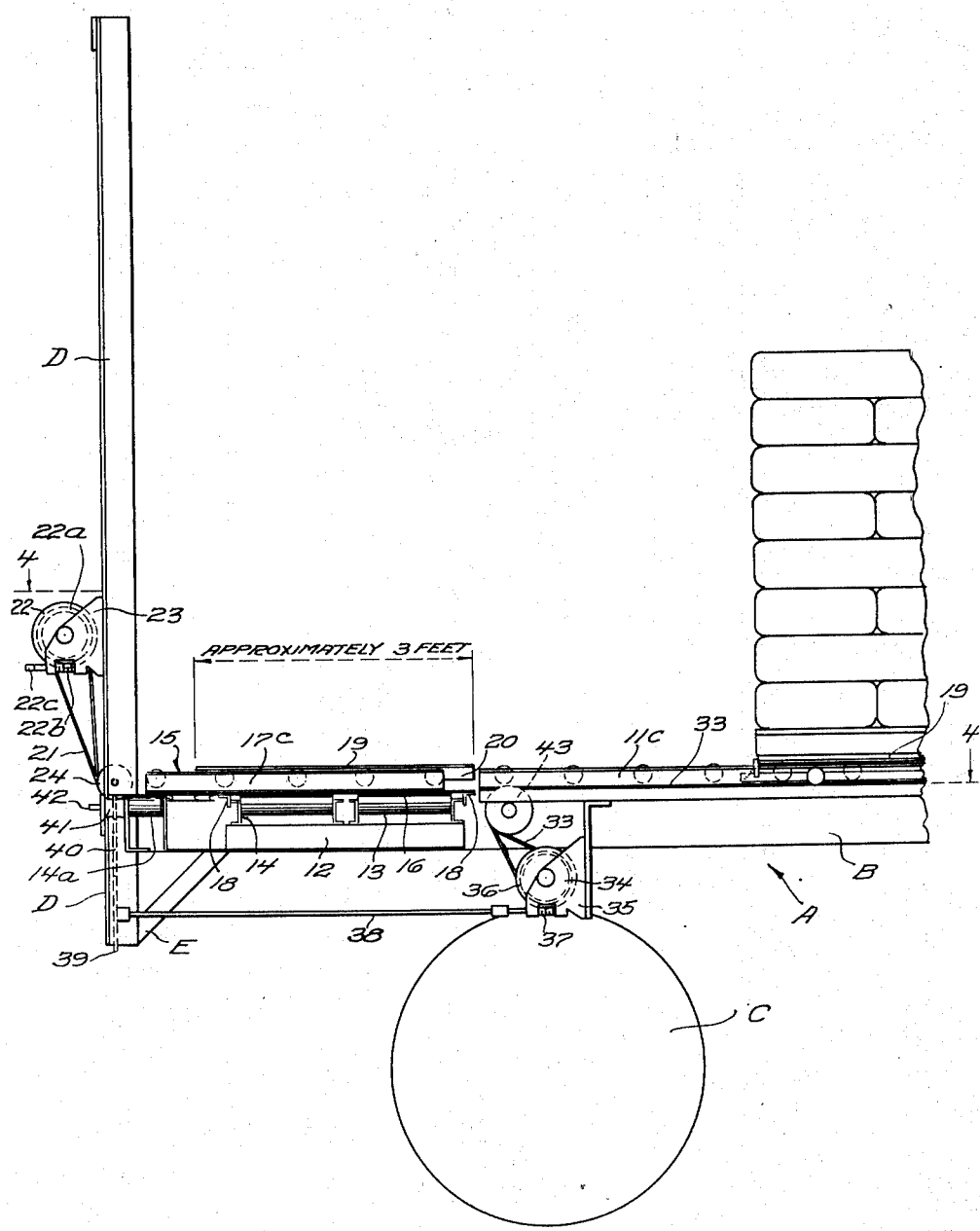

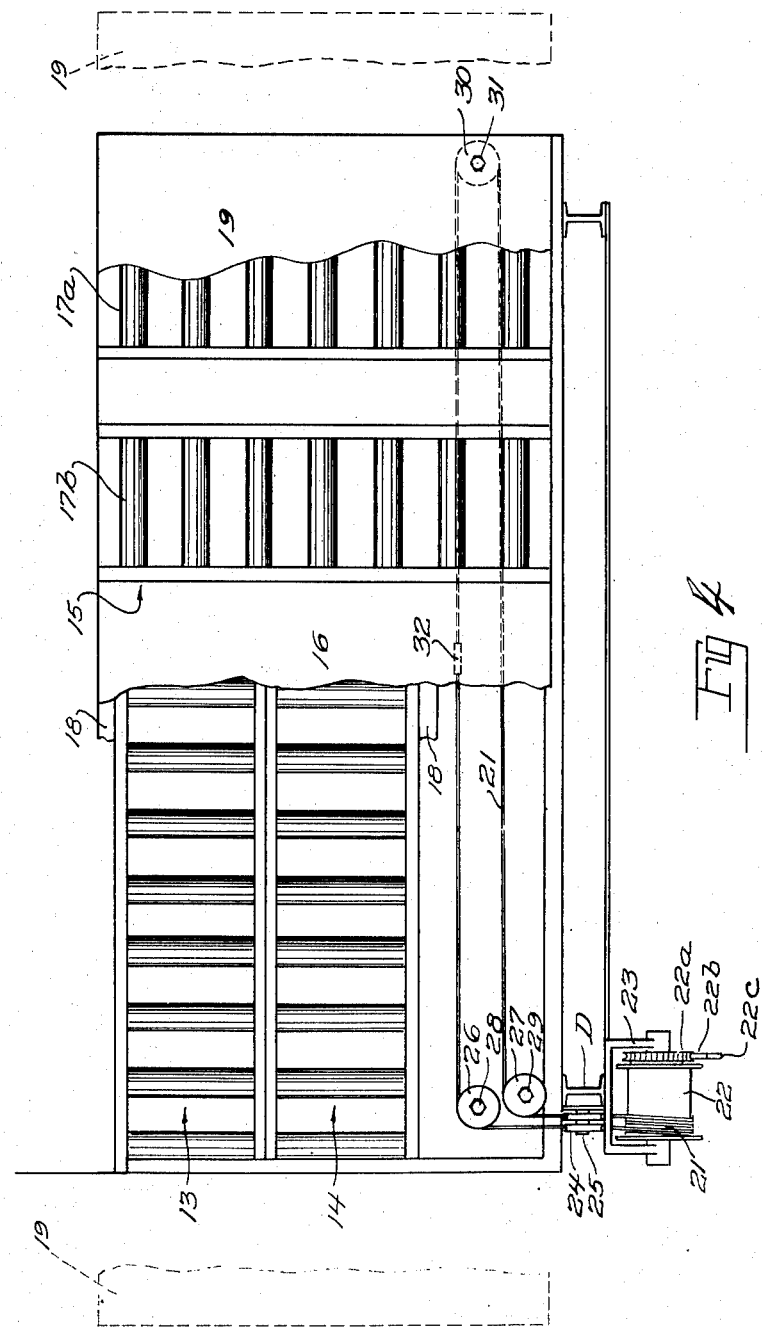

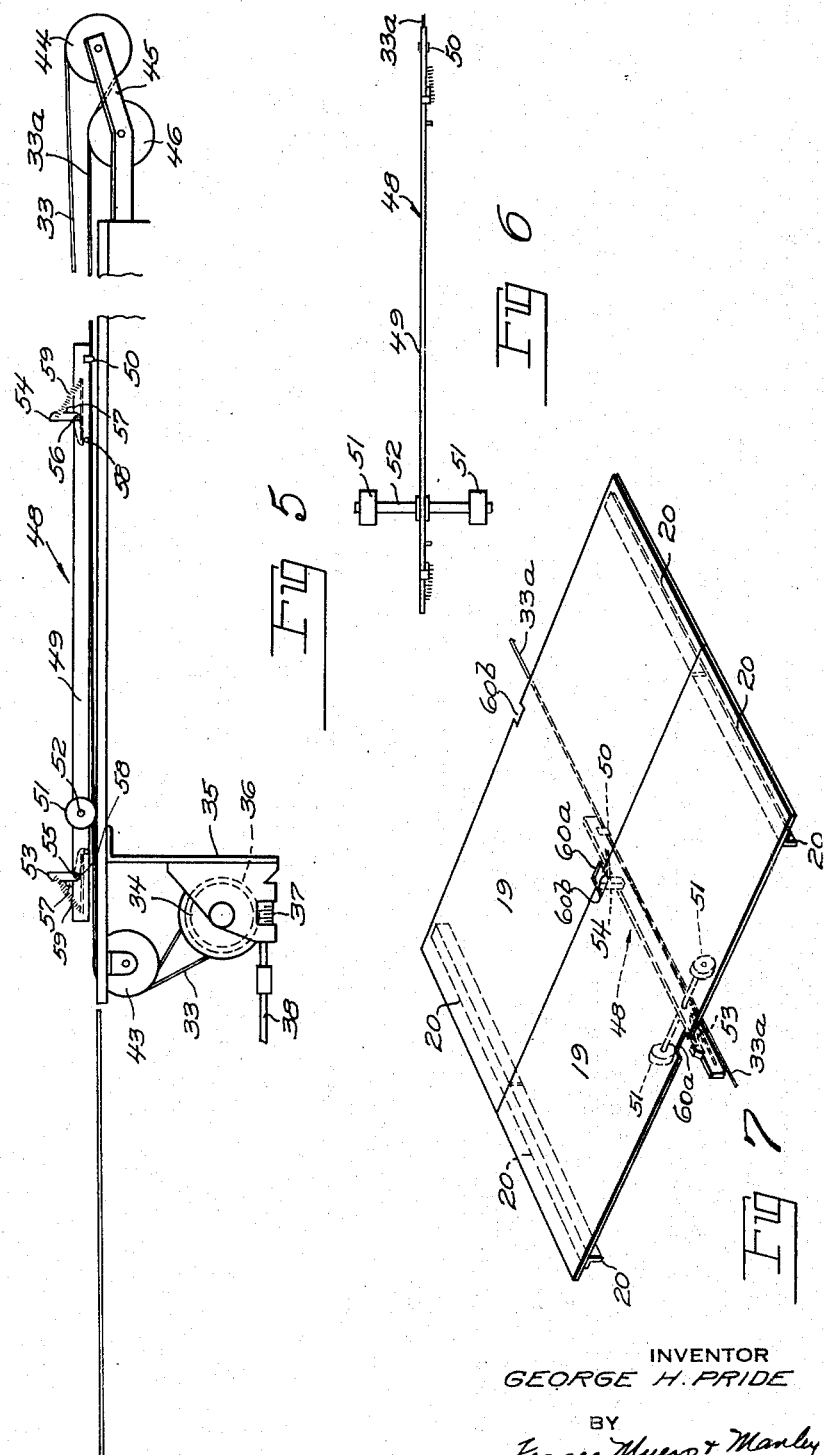

Patented Dec. 12, 1950

2,534,057

UNITED STATES PATENT OFFICE 2,534,057

LOAD HANDLING APPARATUS FOR VEHICLES

George H. Pride, New York, N. Y.

Application December 16, 1948, Serial No. 65,609

7 Claims. (Cl. 214—65)

This invention relates to improvements in load-handling apparatus and more particularly in such apparatus which is intended for use in handling material stacked upon pallets. A pallet with a stack of material thereon may be hereinafter sometimes referred to for convenience as a load unit.

Although the present invention may be embodied in apparatus for shifting load units in various situations, nevertheless, for illustrative purposes, the invention is described herein as embodied in a road vehicle such as a trailer designed to be drawn by a motor tractor.

Road vehicles are generally limited in width either by law or because of conditions in which the load-handling apparatus is intended to operate. The width of road vehicles is at present limited to 8 feet in many States by law. They are usually arranged for loading at their rear end as the most convenient area for loading and unloading; and for greatest efficiency the opening or doorway at the rear end of the vehicle is made as wide as the truck structure permits. Because of the necessity of providing uprights at the rear corners of the vehicle, for supporting a top or other load-covering means, the rear doorway is necessarily somewhat narrower than the full load-carrying width of the vehicle.

In order to utilize the full width of the load-carrying area of the vehicle and thereby maintain for it a high measure of efficiency, the pallets with their loads thereon are preferably about 48 inches wide, so that two such load units in side-by-side relation will just about fill the width of the vehicle. Of course if the vehicle is formed with side walls, the load-carrying width would be slightly less than 96 inches and hence each load unit would be slightly less than 48 inches.

As the width of the door opening is considerably less than the width of two side-by-side load units, it is obvious that in a loading operation the load units by some means must be introduced separately through the doorway, and brought into side-by-side relationship within the vehicle. It is also obvious that load units must be movable longitudinally of the vehicle to enable the latter to be fully loaded.

Among the factors making this problem difficult is the fact that pallets, generally, are not designed to be horizontally moved with a heavy load thereon while on a floor or other supporting surface, for they are not of a character which permits them to be slid upon a flat surface when loaded and, if they are placed directly upon rollers or a roller conveyor, they have no adequate means for keeping them level and no guide means to permit control of their movements upon such rollers.

Another factor to be considered is that industrial lift trucks are commonly used to lift and move such load units from place to place, but it is obvious that such lift trucks cannot readily be driven into and maneuvered within a vehicle. Hence, the solution of this problem of loading palletized load units within a vehicle is substantially limited to the provision of improvements which may be incorporated into the vehicle itself and are of a character which may receive a load unit from a lift truck in a loading operation and which may present a load unit at a position in a vehicle from which it may readily be removed by a lift truck.

An important object of the present invention is the provision, in a vehicle or other load-receiving apparatus, of a load-receiving portion which may readily be mechanically shifted laterally to bring it into desired alignment with a load unit which has been brought into position to be discharged upon the mentioned load-receiving portion, thereby obviating or minimizing the maneuvering of that load unit or of a lift truck or the like carrying such a load unit preliminary to the latter's transfer to said load-receiving portion.

Another object is the provision, in a vehicle or other load receiving apparatus, of a load-receiving plate or the like which may readily be shifted laterally to bring it into desired alignment with a doorway of a warehouse or the like or into a desired position relatively to a doorway of a vehicle or other load-receiving apparatus.

Another object is the provision of means in a vehicle or other load-handling apparatus for receiving a first load unit deposited within the vehicle adjacent an opening or doorway thereof and then mechanically shifting that load unit laterally so that a second load unit, similarly mechanically handled, may be introduced into the vehicle in substantially intimate side-by-side relationship to the first load unit to constitute a pair of load units, the said means to include means to thereafter center the pair of load units transversely of the vehicle and to move them longitudinally within the vehicle or other load-handling apparatus.

These and other objects may be effected by means, of which one embodiment, as applied in a road vehicle, is disclosed for illustrative purposes in the accompanying drawings, in which—

Fig. 2 is an enlarged rear end elevation of such a vehicle, after receiving one load unit and in preparation for receiving another load unit.

Fig. 3 is an enlarged central longitudinal sectional view of the rear end of the vehicle, substantially on the line 3—3 of Fig. 2;

Fig. 4 is an enlarged horizontal sectional view of the rear portion of the vehicle substantially on the line 4—4 of Fig. 3;

Fig. 5 is an enlarged view, mostly of certain parts shown in Fig. 3;

Figure 1:
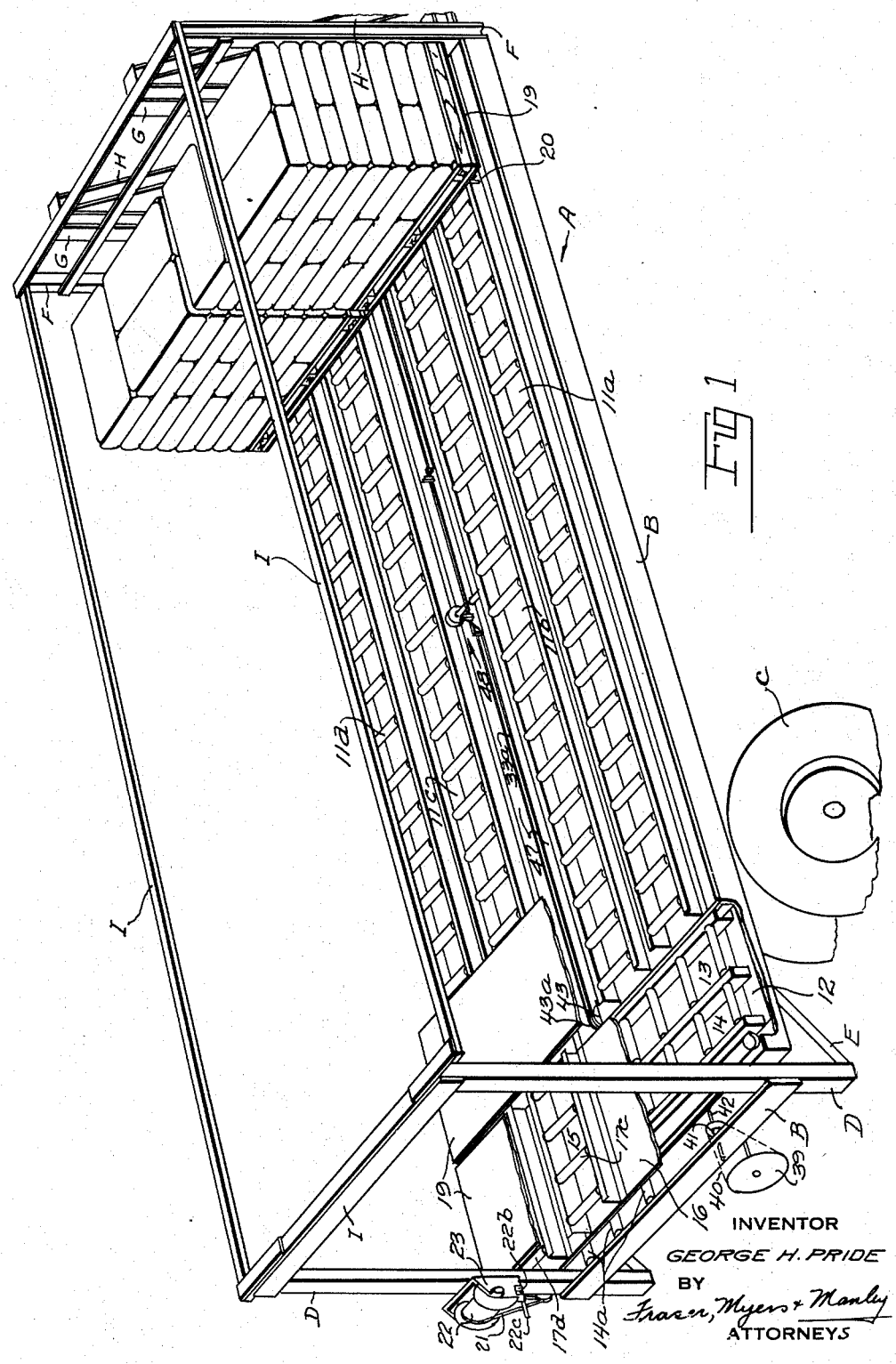
Figure 1 is a perspective view of a partially loaded open body portion of a trailer suitable for use as a load-carrying road vehicle, including load-handling apparatus according to the present invention, certain parts being broken away to show underlying parts.

Fig. 6 is a plan view of a load unit actuator such as is shown in Figs. 3 and 5; and, Fig. 7 is a perspective view showing a removable floor plate 19 and adjacent portions, shown fragmentarily, of another plate 19 in abutting relationship thereto as they would be when in place as a shiftable floor of the vehicle.

As illustrated in the drawings, a vehicle for hauling loads may be in the form of a trailer adapted to be drawn by suitable means as, for example, by a motor tractor and may comprise a body A having a load supporting framework B, which may be arranged for movement upon wheels C, which are shown only diagrammatically; and the body may also include rear uprights D, suitably braced by rear struts E, and front uprights F, G, braced by front struts H. The mentioned uprights may serve to support a top framework I which may serve either to support a rigid top for the vehicle or as a support for a tarpaulin to be used to cover the load.

As illustrated in the drawings, the vehicle is designed to accommodate 16 load units in 8 pairs arranged side by side. For present purposes, we may assume the entire load-supporting area of the vehicle to be about 24 feet long and about 8 feet wide, each load unit being approximately and probably slightly less than 4 feet from side to side and 3 feet from front to back and each pair of such load units measuring about 3 feet in the longitudinal direction of the vehicle and about 8 feet transversely of the vehicle.

In accordance with common practice, the vehicle may be provided with a plurality of longitudinally extending roller conveyors 11a, 11b, 11c, 11d, the rollers of which work on transverse axes, for facilitating the longitudinal movement of load units in the vehicle. However, in contrast to common practice, the mentioned conveyors preferably have their rear ends terminating forwardly of the front faces of the uprights D to an extent corresponding substantially to the front-to-back dimension of a load unit. Hence, as disclosed, the roller conveyors 11 terminate, at their rear ends, approximately and preferably slightly more than 3 feet forwardly of the front faces of the uprights D, as indicated in Fig. 3. This leaves an area at the rear of the vehicle which is approximately the same size and shape, horizontally, as a pair of load units. As all load units, in the loading of a vehicle, are first deposited within the mentioned rear area, that area is hereinafter referred to as an initial load-supporting area.

The mentioned initial load-supporting area of the vehicle is formed with a rear floor portion 12 suitably supported rigidly within the vehicle chassis, and on said floor portion are fixed a pair of transverse roller conveyors 13, 14. These roller conveyors and auxiliary rollers 14a (Fig. 3), mounted in the chassis, rollably support a laterally shiftable assembly 15 of longitudinal roller conveyors, which assembly comprises a laterally shiftable, substantially rigid, flat plate 16 extending substantially across the entire width of the vehicle and having fixed on the upper side thereof a plurality of longitudinally operative roller conveyors 17a, 17b, 17c, 17d. The latter conveyors, respectively, are preferably in the same spaced relationship on the plate 16 laterally of the vehicle as the spaced relationship of the conveyors 11a, b, c, d, so that when the plate 16 is centered with respect to the opposite sides of the vehicle, conveyors 17a, b, c, d constitute aligned continuations, respectively, of the conveyors 11a, b, c, d. The plate 16 rests upon the rollers of the conveyors 13, 14, and upon the rollers 14a, and hence, may roll bodily thereon laterally of the vehicle.

The plate 16, preferably, is of metal and is provided with transversely extending guide pieces in the form of angle bars 18 fixed upon the underside of said plate 16 toward the front and rear margins thereof. These angle bars are so positioned that their depending flanges are in sliding engagement with roller supporting frames of the conveyors 13, 14, thereby deriving guidance for the lateral shifting of the assembly 15.

As stacked loads are commonly carried on pallets which are not suitable for support directly upon conveyor rollers, flat load carrying plates 19 (hereinafter sometimes referred to as "floor plates") each of about the same horizontal dimensions as the initial load-supporting area of the vehicle (about 3 feet x 8 feet in the structure being described), are preferably provided to afford a flat surface for receiving and supporting pairs of side-by-side load units. The plates 19 are removable and are shiftable laterally when in the initial load-supporting area. They are also shiftable longitudinally and preferably have angle bars 20 fixed to the underside and toward opposite side margins thereof, these bars preferably extending substantially from the front to the back of the plate. The depending flanges of the angle bars 20 are positioned to slidably engage the sides of the roller supporting frames of the conveyors 17a and 17d; and also, when the plate 19 is centered and moved forwardly from the initial load-supporting area, the angle bars 20 may similarly coact with the conveyors 11a and 11d. Thus the coaction of the angle bars 20 with the various mentioned conveyors serves to guide the plate 19 during its longitudinal shifting.

Means are provided for mechanically shifting the floor plates 19 laterally while they are in position at the initial load-supporting area at the rear of the vehicle. Such means may advantageously comprise a mechanically operated cable arrangement in which a suitable cable 21 is anchored at its opposite ends to a rotatable drum 22 which may be mounted upon one of the uprights D by means of a suitable bracket 23. The course of the cable 21 preferably extends about pulleys 24 carried on a horizontal axis pin 25, pulleys 26, 27 carried on vertical axis pins 28, 29 respectively, at one side of the vehicle, and pulley 30 carried on a vertical axis pin 31 at the opposite side of the vehicle. All the mentioned axis pins are suitably fixed to the framework of the vehicle. The drum 22 may be rotated by a worm-wheel 22a fixedly associated with said drum to constrain the two to turn together, and a worm 22b supported in suitable bearings within the bracket 23 to mesh with and operate the worm-wheel. The outer end 22c of the worm may be polygonal in cross section to receive a suitable hand crank or wrench (not shown) for rotating said worm and thus operating the drum to laterally shift the laterally shiftable assembly 15 together with a plate 19 thereon.

The cable 21 is so fixed to the drum 22 that, as the drum is rotated in either direction, one end of the cable is taken in upon the drum and the other end of the cable is paid out therefrom; hence, with rotation of the drum, the cable pursues linear movement transversely of the truck between the pulley 30 and the pulleys 26, 27. As illustrated in the drawing, particularly Fig. 4, the cable 21 is fixed to the underside of the plate 16, at an anchorage point 32 on the plate, preferably near the center thereof. Thus, by suitable rotation of the drum, the plate 16 with the conveyors 17a, b, c, d thereon and a plate 19, either alone or with a load unit or units thereon, may be shifted laterally in either direction for loading and unloading the vehicle in the manner described herein.

Although, under some conditions, a fully loaded plate 19 may be manually shifted longitudinally in the vehicle, as for example, to shift it from the initial load-supporting area at the rear of the vehicle to or toward the front end of the vehicle, nevertheless under many loading and unloading conditions, such manual shifting would be impracticable. The present invention, therefore, preferably includes mechanical means for effecting such longitudinal shifting of loaded plates 19. Such means may advantageously be in the form of a cable 33 anchored at its opposite ends to a rotatable drum 34, which may be mounted upon a depending bracket 35 suitably fixed to the underside of the vehicle body.

The drum 34 may be rotated by any suitable mechanical or manual means, such means, as illustrated in the accompanying drawings, comprising a worm-wheel 36 fixedly associated with said drum to constrain the two to turn together, the worm-wheel being driven by a worm 37 fixed to a suitably supported horizontal shaft 38 which extends to the rear of the vehicle. To derive suitable mechanical advantage, the shaft 38 may have a relatively large sprocket wheel 39 fixed thereon, at its rearmost end, driven by a chain 40, which is actuated by a relatively small sprocket 41 fixed to a shaft 42. The accessible rear end of the shaft 42 may be polygonal in cross section to receive either a hand crank or a motor driven socket wrench (neither being shown), for rotating said sprocket and thus, through the described transmission mechanism, rotating the drum 34.

The course of the cable 33 preferably extends from the drum 34 over a pulley 43, located just forwardly of the initial load-supporting area, thence forwardly to a pulley 44 mounted in a forward extension 45 at a point somewhat forwardly of the vehicle's load-carrying area. The cable 33, after passing around the pulley 44, passes over an idler pulley 46, also mounted on the extension 45. This idler pulley serves to guide a remaining portion 33a of the cable to a pulley 43a, which is disposed alongside pulley 43, thence the cable passes back to the other end of the drum 34. The disposition of the mentioned pulleys and cable is such that at least the portion 33a of the cable extends centrally within the vehicle above the latter's sub-floor at a level substantially corresponding to the bottom level of the conveyors 11a, b, c, d. The mentioned cable portion 33a preferably runs longitudinally of the vehicle in a clear longitudinal space 47 between longitudinal conveyors 11b and 11c, as best seen in Fig. 1.

Plate actuating means for shifting the plates 19 longitudinally may advantageously be in the form of a mobile plate pusher 48 which, as best seen in Figs. 5 and 6, may comprise a longitudinal bar 49 suitably fixed as by a cleat 50 at its forward end to the cable portion 33a. At its rear end the bar 49 is supported and travels upon wheels 51, which are carried upon an axle 52 and ride upon the sub-floor of the vehicle within the clear space 47, the adjacent sides of the conveyors 11b and c serving to guide the rear end of the plate pusher 48 to constrain it to move in a substantially straight longitudinal line.

The bar 49 of the plate pusher is provided with two fingers 53, 54 which are respectively pivoted at the rear and front ends of the bar 49 at pivot points 55, 56. The fingers 53, 54 are oppositely disposed to function in opposite directions but otherwise are preferably alike; therefore, the following description with reference to finger 53 should suffice as a description of both of them. Referring, therefore, to finger 53, said finger may pivot in a vertical longitudinal plane between an upstanding position (shown in full lines in Fig. 5) in which it projects upwardly sufficiently to engage a transverse edge of a plate 19, and a substantially depressed or horizontal position (shown in broken lines in Fig. 5) in which it is depressed to extend below the level of the underside of a plate 19 and, hence, in a non-engaging position relatively thereto. A stop 57 fixed to the bar 49 is so positioned as to prevent the finger 53 from pivoting rearwardly from its upstanding position. The finger, however, is free to pivot forwardly to its depressed position indicated in Fig. 5 in broken lines, the downward or depressing movement being limited by a stop 58 on the bar 49. A spring 59, which may be a tension coil spring, is arranged with one of its ends fixed to the bar 49 and its other end fixed to the finger 53 at such a location thereon that when the finger is in its fully depressed position against the stop 58, the line of the force of the spring passes below the pivot point 55 to hold down the finger, and when the latter is pivoted upwardly slightly from its depressed position, the line of force of the spring passes above the pivot point 55 and causes the finger to be urged upwardly by the spring to its upstanding plate-engaging position. Under this arrangement it will be seen that, except when the finger 53 is at or very close to its fully depressed position, the spring 59 normally urges and holds the finger toward and in its upstanding position.

Each floor plate 19, as best seen in Fig. 7, preferably is formed with notches 60a, 60b at opposite transverse edges thereof. These notches, as will be understood from the following operational description, are provided to afford spaces between adjacent plates 19 into which the upstanding fingers 53, 54 may extend to shift said plates longitudinally. The plates 19 preferably should be of very light but nevertheless strong material so that they will be light enough to be manually placed within and removed from the vehicle in loading and unloading operations. Hence the plates may advantageously be of suitable plywood or of thin, light metal of suitable characteristics. If the plates 19 are made of relatively heavy material, suitable means may be provided for mechanically placing and removing such plates; however, as such mechanical means do not form any part of the present invention, they are not

Operation

In order to understand fully the operation of the apparatus comprising the present invention and to understand its advantages in practical use, it may be assumed that the vehicle is to be loaded from a warehouse doorway which is of about the same width or slightly less than the width of the space between the uprights D of the vehicle, which latter space for convenience is referred to herein as the "vehicle doorway."

The driver of the tractor, which moves the vehicle from place to place, endeavors to back the vehicle to the warehouse doorway with the latter doorway and the vehicle doorway in perfect alignment. Such perfection in backing the vehicle into place is rarely if ever achieved, so that the effective doorway width for passing a load from the warehouse into the vehicle may often be somewhat less than the width of the vehicle doorway. Under these conditions and even under the condition of obtaining perfection of alignment between the two doorways, it is obvious that two load units in side-by-side relationship could not possibly be moved simultaneously, broadside, into the vehicle. Also, it should be borne in mind that an industrial lift truck such as is commonly used in warehouses for moving palletized stacked loads, is not ordinarily maneuvered so precisely, with a load unit thereon, as to bring it to a preferred position in the doorway.

Before commencing the loading of a vehicle embodying this invention, a first plate 19 to be loaded is set in place at the initial load-supporting area at the rear of the vehicle, this plate resting in the manner already described upon the conveyor assembly 15. At that time there would be no other floor plates 19 in the vehicle, such other floor plates having been laid aside in readiness for placing in the vehicle in turn as they are to be loaded. Also, preliminary to loading of the vehicle, the forward finger 54 of the plate pusher is fully depressed to its broken line position shown in Fig. 5 and is held in that position by the tension spring associated therewith. The rearmost finger 53 of the plate pusher, at this time, is in its upstanding position.

Upon observance of the mentioned preliminary steps, the worm 22b is manually rotated by a suitable crank or wrench to rotate the drum 22 and thus, through the medium of the cable 21, cause the conveyor assembly 15 with the plate 19 thereon to shift laterally to an eccentric position in which one-half of the plate 19 underlies a first load unit carried by a lift truck. Thereupon, the lift truck lowers the load unit onto the first plate 19 and then withdraws to obtain another load unit. It should be obvious that in order to accomplish this precise placing of the first load unit at one side of a plate 19, it is much easier and, hence, more rapid and economical, to shift the conveyor assembly 15 and the plate 19 laterally than to have the operator of the lift truck maneuver that truck back and forth repeatedly with its load in order to achieve preciseness of position of the load unit over the plate 19.

Assuming that the mentioned first load unit was to be placed upon the right side of the first plate 19, as viewed from the rear of the vehicle, it will be seen that the plate 19 with the conveyor assembly 15 will first have been shifted laterally toward the left, as viewed in Fig. 2, approximately to the position shown therein at the left in broken lines, or possibly even further to the left than indicated by such broken lines. Then, after the first load unit has been deposited upon the plate 19 and the lift truck has withdrawn, the plate 19 is shifted to the right by the lateral shifting means already described; and in order to permit a second load unit to be placed upon the left side of the plate in a similar manner, the plate 19 with the first load unit thereon is moved to an extreme rightward lateral position, as shown in broken lines at the right of Fig. 2, or possibly even somewhat more rightwardly than indicated by such broken lines.

Then a second load unit is deposited upon the plate 19 in the same manner as was employed to place the first load unit upon said plate. After the second load unit has been deposited on the plate 19, and the lift truck has withdrawn, the first plate 19 with the two load units thereon is moved laterally to the center of the vehicle by operation of the drum 22. Then the loaded first plate 19 is moved forwardly in the vehicle to the front end thereof.

The mentioned forward movement of the first plate 19 is accomplished by means of the drum and cable arrangement 34, 33 shown in detail in Fig. 5. After the loaded first plate 19 has been centered at the rear of the vehicle, the drum 34 is operated, by rotation of the shaft 38 with a suitable crank or power wrench, to move the cable portion 33a rearwardly so that the plate pusher 48, which previously may have been disposed forwardly of the first plate 19 during the loading of the latter, will be moved longitudinally and rearwardly to a position beneath the loaded plate 19.

As the plate pusher 48 moves rearwardly, the finger 53, upon engaging the plate 19, will tilt forwardly somewhat and slide underneath said plate until the finger 53, upon clearing the rear edge of the loaded plate 19, will be drawn back to its upstanding position by the spring 59 in position to seat within the notch 60a of the plate. Then, the drum 34 is rotated in the opposite direction so that the plate pusher 48 will then start to move forwardly and push the first loaded plate 19 forwardly. This forward motion of the pusher 48 is continued until the plate 19 with its load is disposed at the forward end of the vehicle, as shown in Fig. 1. Suitable means, not shown, are provided in the vehicle to pin or lock the mentioned first plate 19 in its described forward position, and to lock all other loaded floor plates in their proper positions, against any possibility of longitudinal movement thereof. During the loading of a second plate 19 the plate pusher 48 may remain in its last described position toward the front end of the vehicle.

A second plate 19 is then manually placed in position upon the conveyor assembly 15 at the rear of the vehicle and with similar lateral shifting thereof, a pair of load units is placed thereon, after which the loaded second plate 19 is centered, and plate pusher 48 is moved rearwardly by the operation of the drum 34 to bring the plate pusher to a position beneath the second plate 19, with the finger 53 of the plate pusher in the notch 60a at the rear of said plate. Then the plate pusher, by reverse operation of the drum 34, is moved forwardly in the vehicle to move the loaded second plate 19 forwardly to an abutting position with respect to the first plate 19, after which the said second plate 19 is then fastened securely against longitudinal movement.

Thereafter, the remaining plates 19, seriatim, are similarly placed within the vehicle, loaded and moved forwardly to abut with preceding plates 19. Of course, the last loaded plate 19 merely remains upon the conveyor assembly 15 during transit. Suitable means, not shown, are preferably provided for securing the rearmost plate 19 in position upon the conveyor assembly 15 against longitudinal movement; and means, not shown, also are preferably provided for locking the conveyor assembly 15 in central position so that it may not shift, either in transmit or while plates 19 with loads thereon are being moved forwardly from the rear of the vehicle. When the vehicle is loaded in the manner just described, the plate pusher 48 may remain toward the rear of the vehicle in a position underlying the rearmost plate 19.

In order to unload the vehicle after it has been backed into reasonably accurate alignment with the doorway of a receiving warehouse, a lift truck in the warehouse is brought to a position at the vehicle doorway with its lifting fork adjacent to the point from which a first load unit is to be removed. Then the drum 22 is operated to move the plate 19 laterally to bring the said first load unit to a position in longitudinal alignment with the lift truck and clear of both uprights D. The lift truck then is moved forwardly so that its fingers extend underneath the pallet of the mentioned load unit and then the lift truck lifts the load unit from the plate 19 and withdraws into the warehouse with its load. By operation of the drum 22, the rearmost plate 19 is shifted laterally to bring its other load unit thereon into longitudinal alignment with a lift truck in the doorway, whereupon the said other load unit is removed from the rearmost plate.

Then, the rearmost plate 19 is manually removed from the vehicle and laid aside. After this the finger 53 of the plate pusher 48 is pivoted to its fully depressed position, as shown in Fig. 5 in broken lines, in which position it is held by the tension of the spring 59. At the same time the finger 54 is raised from its depressed position and is held in its upright position by its related spring. The drum 34 is then operated, in the manner already described, to move the plate pusher 48 forwardly to a position underlying the second floor plate 19 to be unloaded. In moving under this plate, the finger 54 becomes depressed to some extent, but not to its completely depressed position. The free end of the finger 54 thus slides along the underside of the second plate 19 to be unloaded until, upon reaching the space provided between that plate and the next plate forwardly thereof by the adjacent notches 60b, 60a in those plates, the finger 54, as a result of the tension of its related spring, springs upwardly to its upstanding position in said space wherein it may engage the front edge of the plate 19, which is next to be pulled to the rear of the vehicle. The operation of the drum 34 is then reversed so that the plate pusher 48 then moves rearwardly with its finger 54 pushing the second plate 19 rearwardly to be unloaded.

When the second plate to be unloaded reaches its position at the rear of the vehicle, the plate pusher 48 is then moved forwardly so that the finger 54 disengages the notch 60b in that plate so that the latter may then be moved laterally in opposite directions to enable the pair of load units to be removed therefrom by a lift truck in the same manner as load units were removed from the rearmost plate as already described. After the second floor plate has been emptied, it is then manually removed completely from the vehicle and laid aside. Thereafter, the same procedure is followed for pushing the remaining floor plates 19 with their loads to the rear of the vehicle for unloading.

It should be understood that although the operation of the present invention has been described with reference to loading and unloading through the door of a warehouse in which the floor may be of approximately the same height as the level of floor plates 19 in the vehicle, nevertheless it should be understood that industrial lift trucks may function to deposit load units in a vehicle and also to remove them therefrom under conditions in which the warehouse floor is not at precisely the same level as the floor plates 19. In fact, such a lift truck, running on the ground at a loading point, could lift load units from the ground into the vehicle or remove them therefrom, this lifting operation being inherent in the use of such lift trucks. Under any of these conditions, however, it will be apparent that the functioning of the apparatus comprising the present invention is substantially as hereinbefore described.

Although the drums 22 and 34 are illustrated in the drawings as arranged for operation by one standing at the rear of the vehicle, nevertheless it is recognized that such an arrangement might be inconvenient in some instances; therefore, within the present invention the drums 22 and 34 and their operating mechanism may be so arranged that either or both may be operated by a person standing at one side of the vehicle.

It should also be apparent that the present invention constitutes means which greatly minimize and, in fact, practically obviate manual handling of stacked material to be transported by road vehicles such as trucks or trailers; also that this invention may be advantageously utilized for handling material in arrangements not directly involving the use of road vehicles. It should also be understood that for purposes of illustration in the present application, only one embodiment of the invention has been shown, and that the inventive concept may be employed with substantial variations in details, while nevertheless not departing from the invention as defined in the following claims.

What I claim is:

1. A vehicle comprising a plurality of horizontally shiftable floor plates, and a body adapted to support said floor plates; the said body having portions defining a passageway through which the vehicle may be loaded and unloaded and also having means for shiftably supporting said floor plates, one at a time, adjacent said passageway for horizontal movement in opposite directions transversely of said passageway; the said plates being removable and, when in position in the vehicle, being in abutting relationship in a series extending longitudinally of said body and terminating at one end at said passageway; and said plates being shiftable longitudinally of said body.

2. A vehicle according to claim 1, the said passageway being at one end of the vehicle, and said body having mechanical means associated therewith for shifting said plates horizontally in both the mentioned transverse and longitudinal directions.

3. A vehicle comprising a horizontally shiftable floor plate, and a body adapted to support said floor plate; the said body having portions defining a passageway through which the vehicle may be loaded and unloaded and having also means for shiftably supporting said floor plate adjacent said passageway for horizontal movement in opposite directions transversely of said passageway, the mentioned floor plate supporting means comprising a horizontally shiftable element, and means for shifting said element transversely across said passageway; and the floor plate being disposed upon said element and constrained to shift therewith in the latter's mentioned transverse movement.

4. A vehicle according to claim 3, the vehicle body having rollers fixedly journalled therein in position to support said element for such transverse movement of the latter upon said rollers, and said element comprising a roller conveyor assembly having rollers journalled therein in position to support the floor plate upon the latter rollers for movement of the floor plate in a direction substantially angular to the mentioned transverse movement of the said element.

5. A vehicle according to claim 4, comprising also means for transversely shifting said element comprising a cable connected to said element and a reversible drum coacting with the cable to linearly move the latter in opposite directions in a line substantially parallel to the said transverse movement.

6. A vehicle according to claim 4, comprising a plurality of said floor plates, the said plates being removable and, when in position in the vehicle being in abutting relationship in a series extending longitudinally of said vehicle body and terminating at one end at said passageway, the said floor plates, further, being shiftable longitudinally of said body; the said vehicle, further, including a cable with means associated therewith for releasably engaging said floor plates separately and a reversible drum coacting with said cable to linearly move the latter in opposite directions in a line substantially parallel to the longitudinal extension of the series of floor plates.

7. In load-handling apparatus including plural load-carrying plates supported for horizontal movement along a path substantially common to all said plates; a plate pusher comprising a carriage guided for movement in a line parallel to the line of said movement of plates in a space beneath the latter, at least two pivotal fingers arranged on said carriage in operatively opposed positions, and means coacting with said carriage and fingers to yieldably hold the latter selectively in upstanding positions in which they may engage and push an overlying plate and a depressed position clear of engagement with any plate, one of said fingers being adapted to coact with a plate to move it in one direction and the other of said fingers being adapted to coact with a plate to move it in an opposite direction.

GEORGE H. PRIDE.

REFERENCES CITED

The following references are of record in the file of this patent:

UNITED STATES PATENTS

| Number | Name | Date |
|---|---|---|
| 1,932,955 | Coppinger | Oct. 31, 1933 |
| 1,971,991 | Robertson | Aug. 28, 1934 |
| 2,088,122 | Taylor | July 27, 1937 |
| 2,146,436 | Lima | Feb. 7, 1939 |
| 2,421,128 | Pride | May 27, 1947 |
| 2,442,549 | Pearlman | June 1, 1948 |
| 2,459,045 | Pride | Jan. 11, 1949 |